US010133889B2

(12) United States Patent
Cletheroe et al.

(10) Patent No.: US 10,133,889 B2
(45) Date of Patent: Nov. 20, 2018

(54) POWER SCHEDULING FOR SHORT-RANGE WIRELESS TAGS

(71) Applicant: Microsoft Technology Licensing, LLC, Redmond, WA (US)

(72) Inventors: Daniel Cletheroe, Cambridge (GB); Nicolas Villar, Cambridge (GB); Greg Saul, Cambridge (GB); Haiyan Zhang, Cambridge (GB); Christian Holz, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 54 days.

(21) Appl. No.: 15/231,352

(22) Filed: Aug. 8, 2016

(65) Prior Publication Data

US 2017/0132438 A1 May 11, 2017

Related U.S. Application Data

(63) Continuation-in-part of application No. 14/931,049, filed on Nov. 3, 2015.

(51) Int. Cl.
G06K 7/10 (2006.01)
G07G 1/00 (2006.01)

(52) U.S. Cl.
CPC ..... *G06K 7/10158* (2013.01); *G06K 7/10128* (2013.01); *G06K 7/10356* (2013.01); *G07G 1/0036* (2013.01); *G07G 1/009* (2013.01)

(58) Field of Classification Search
CPC .... G07G 1/0036; G07G 1/009; H04B 5/0062; H04B 7/0697; G06K 2017/0051; G06K 7/10158; G06K 7/10128; G06K 7/10336

USPC .................. 340/10.5, 572.1, 5.92
See application file for complete search history.

(56) References Cited

U.S. PATENT DOCUMENTS

| 5,521,601 | A  | 5/1996  | Kandlur et al. |
| 6,903,656 | B1 | 6/2005  | Lee |
| 7,413,124 | B2 | 8/2008  | Frank et al. |
| 7,432,855 | B2 | 10/2008 | Mohamadi |
| 8,463,332 | B2 | 6/2013  | Sato et al. |

(Continued)

FOREIGN PATENT DOCUMENTS

| EP | 2208390 B1    | 2/2015 |
| WO | 2014067547 A1 | 5/2014 |

OTHER PUBLICATIONS

"International Search Report and Written Opinion Issued in PCT Application No. PCT/US2016/060274", dated Feb. 14, 2017, 10 Pages.

(Continued)

*Primary Examiner* — Ali Neyzari

(57) ABSTRACT

A reader device for short-range wireless tags comprises a sensing module coupled to one or more RF antennas. The sensing module is arranged to selectively activate and deactivate individual RF antennas and to read data from a plurality of objects comprising short-range wireless tags which are proximate to an active RF antenna. A scheduler module within the reader device is arranged to obtain device characteristics for the plurality of objects based at least in part on data read by the sensing module and then to generate a powering schedule for the plurality of objects based on the device characteristics. The generated powering schedule is then implemented by the sensing module.

20 Claims, 8 Drawing Sheets

(56) References Cited

U.S. PATENT DOCUMENTS

| | | | |
|---|---|---|---|
| 8,670,711 B2 | 3/2014 | Fine et al. | |
| 8,803,661 B2* | 8/2014 | Kaaja | G06K 7/10009 |
| | | | 340/10.1 |
| 9,270,337 B2 | 2/2016 | Zhu et al. | |
| 9,270,344 B2 | 2/2016 | Rosenberg | |
| 2008/0186174 A1 | 8/2008 | Alexis et al. | |
| 2011/0263297 A1 | 10/2011 | Kaaja et al. | |
| 2013/0196596 A1 | 8/2013 | Parekh et al. | |
| 2014/0139347 A1 | 5/2014 | Forster | |
| 2014/0148095 A1 | 5/2014 | Smith et al. | |
| 2016/0190851 A1 | 6/2016 | Pudipeddi et al. | |

OTHER PUBLICATIONS

"NFC EZ430 Reader Module Reference Design", Published on: Sep. 24, 2014, 1 page Available at: http://www.ti.com/tool/TIDM-NFC-EZ430-MODULE.

Hardy, et al., "Touch & Interact: Touch-based Interaction of Mobile Phones with Displays", In Proceedings of the 10th international conference on Human computer interaction with mobile devices and services, Sep. 2, 2008, pp. 245-254.

U.S. Appl. No. 14/931,049, Villar, et al., "Multi-Modal Sensing Surface", filed Nov. 3, 2015, 40 pages.

Ho, et al., "Coupled Data Communication Techniques for High-Performance and Low-Power Computing", In Publication of Springer, Jun. 23, 2010, 27 pages.

Epawn—The next generation gaming experience, "Motion Capture for 'Toys for Life' Games", Retrieved on Oct. 10, 2016, 10 pages; Available at: http://epawn.fr.

Kubitza, et al., "WebClip: A Connector for Ubiquitous Physical Input and Output for Touch Screen Devices", In Proceedings of UbiComp '13, Sep. 8-12, 2013, 4 pages.

"International Preliminary Report on Patentability Issued in PCT Application No. PCT/US2016/060274", dated Sep. 25, 2017, 5 Pages.

* cited by examiner

POWER SCHEDULING FOR SHORT-RANGE WIRELESS TAGS

CROSS-REFERENCE TO RELATED APPLICATION

This non-provisional utility application is filed as a continuation-in-part of U.S. application Ser. No. 14/931,049 entitled "Multi-modal Sensing Surface" and filed on Nov. 3, 2015, which is incorporated herein in its entirety by reference.

BACKGROUND

Near-field communication (NFC) and radio-frequency identification (RFID) readers can identify objects via parasitically powered tags which when activated transmit the identifier (ID) of the tag. The antenna within an NFC tag is round or rectangular and magnetic induction between the antenna in the tag and an antenna in a proximate NFC reader device provides the energy for the tag to communicate its ID back to the reader device. There are many uses for NFC tags including for authentication (e.g. where the NFC tag provides an access token), for automation (e.g. where the NFC tag may initiate an action, change settings, etc.), to bootstrap other wireless connections, in commerce (e.g. in a contactless payment system), in gaming, etc.

SUMMARY

The following presents a simplified summary of the disclosure in order to provide a basic understanding to the reader. This summary is not intended to identify key features or essential features of the claimed subject matter nor is it intended to be used to limit the scope of the claimed subject matter. Its sole purpose is to present a selection of concepts disclosed herein in a simplified form as a prelude to the more detailed description that is presented later.

A reader device for short-range wireless tags comprises a sensing module coupled to one or more RF antennas. The sensing module is arranged to selectively activate and deactivate individual RF antennas and to read data from a plurality of objects comprising short-range wireless tags which are proximate to an active RF antenna. A scheduler module within the reader device is arranged to obtain device characteristics for the plurality of objects based at least in part on data read by the sensing module and then to generate a powering schedule for the plurality of objects based on the device characteristics. The generated powering schedule is then implemented by the sensing module.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

Figure 1:
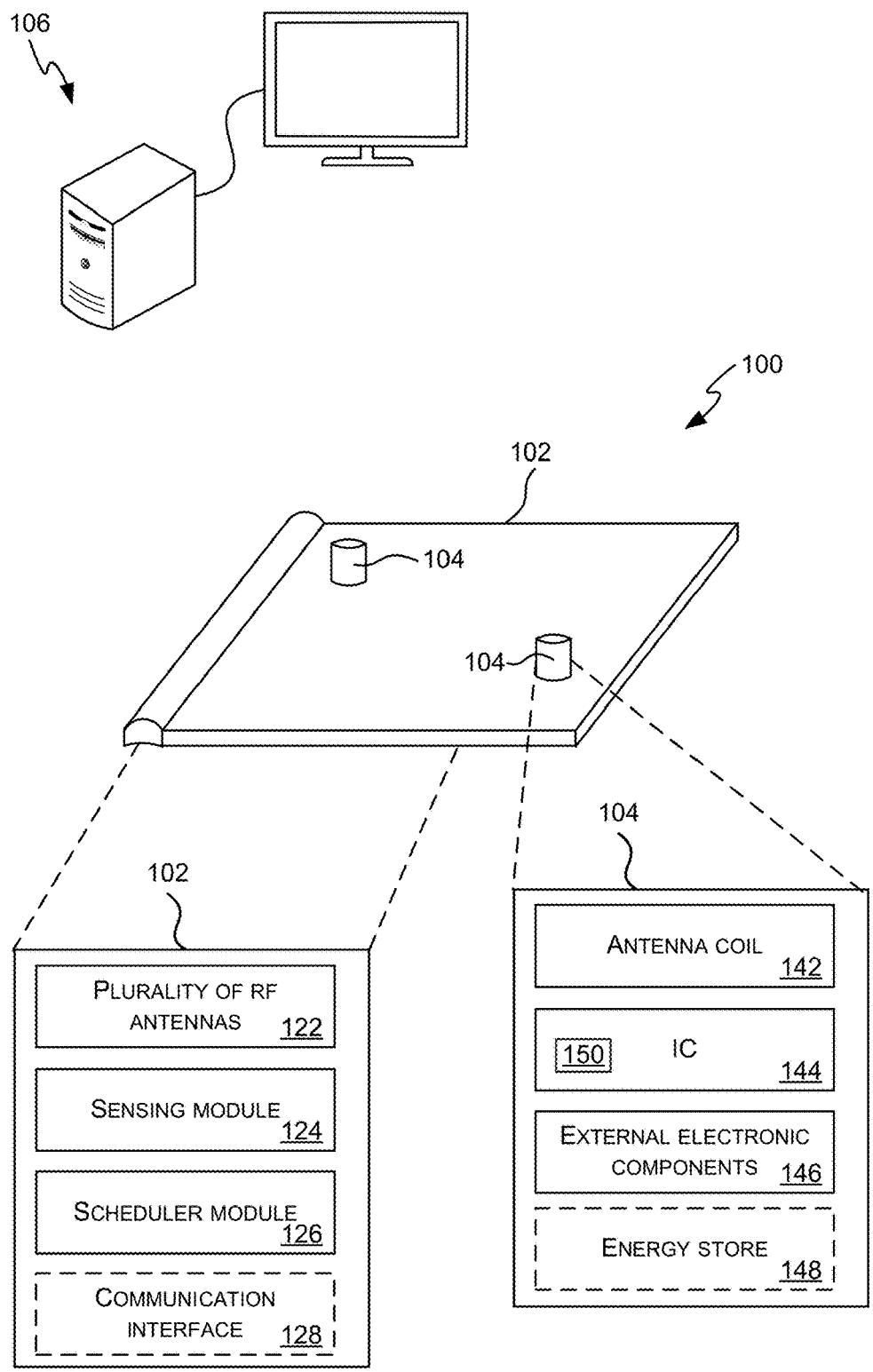
FIG. 1 is a schematic diagram showing a system comprising a reader device and a plurality of smart objects.

The detailed description provided below in connection with the appended drawings is intended as a description of the present examples and is not intended to represent the only forms in which the present example are constructed or utilized. The description sets forth the functions of the example and the sequence of operations for constructing and operating the example. However, the same or equivalent functions and sequences may be accomplished by different examples.

As described above, NFC readers can identify objects via parasitically powered tags which when activated transmit the ID of the tag (which may be a unique ID). In some situations there may be large numbers of tags which are proximate to the same antenna in a reader (where this antenna may be referred to as a 'reader antenna') and the amount of energy which is available to power the tags is limited. This may not be problematic where the tags are simple and have very low power requirements; however, where the tags support input/output and/or where the tag outputs harvested power to power external components connected to the tag, their power requirements are much higher. If there is too much loading on a single reader antenna or on the reader device overall, some or all of the tags may fail to provide power or communicate (e.g. depending upon their coupling to the reader antenna).

The embodiments described below are not limited to implementations which solve any or all of the disadvantages of known short-range wireless tags and readers of short-range wireless tags.

Described herein is a reader device for short-range wireless tags (e.g. NFC or short-range RFID tags) that comprises a plurality of RF antennas, a sensing module and a scheduler module. The sensing module is arranged to read data, such as an identifier (which may be a unique identifier, GUID or UUID), from a tag which is proximate to, and powered by, one of the RF antennas. The scheduler module is arranged to determine a powering schedule for the proximate tags, based at least in part on data received by the sensing module and the reader device is further arranged to control the activation of the RF antennas based on the powering schedule.

The powering schedule enables the reader device to perform active power management and thereby allow multiple short-range wireless tags to remain powered through controlled harvesting of the electromagnetic field. The powering schedule may be implemented by the reader device and/or the short-range wireless tag.

Described herein are also smart objects which each comprise a short-range wireless tag and may be used in conjunction with the reader device described herein. The short-range wireless tag in a smart object comprises an IC (e.g. an NFC tag IC) that supports connections to external electronic components. These connections may provide a communications interface (e.g. I2C, SPI, UART, GPIO) and/or an output of DC power (e.g. in the form of a voltage rail) to power external electronic components. In various examples, a smart object may comprise an energy storage device which can be used to store energy harvested from the field generated by the reader device, such that the object can continue to operate for a limited period of time without the field being present.

In various examples the smart object has one or more low power states which extract less power from the reader device than when fully on. In a lowest one of these low power states, the smart object does not harvest any power but instead uses only the energy stored in a local (i.e. internal) power store and which has previously been charged by harvesting power from the reader device's electromagnetic field. In another one of these low power states, the smart object may harvest power so that it can operate without drawing power from an internal power store but it does not harvest power to charge the internal power store. The smart object switches between operating states based at least in part on instructions provided by the reader device where these instructions may be in the form of a sequence of commands (e.g. "change from state A to state B") or scheduling data (e.g. which defines a sequence of state changes and timing information about when the state changes should occur).

By implementing at least some of the scheduling within the smart object (albeit under the overall control of the reader device), the power management can be performed at a more granular level (e.g. per smart object) rather than a per-antenna basis. In addition, or instead, it reduces the complexity of the reader device (e.g. since it may not need to keep track of all the individual objects, their state or charging requirements). In addition, it reduces the communication overhead.

FIG. 1 is a schematic diagram showing a system 100 comprising a reader device 102 and a plurality of smart objects 104. In the example shown, the reader device 102 is a surface sensing device (e.g. which may be flat, as shown in FIG. 1, or bent or curved); however, in other examples the reader device may be of any shape. In various examples, the surface sensing device may comprise a three-dimensional arrangement which provides a sensing area within a cavity or volume defined by (e.g. inside) the surface sensing device. The reader device 102 comprises a plurality of RF antennas 122 (e.g. an array of RF antennas, although in some examples, the reader device 102 may comprise only a single RF antenna), a sensing module 124 and a scheduler module 126. The reader device 102 may also comprise a communication interface 128. A smart object 104 comprises a short-range wireless tag comprising an antenna coil 142 and an IC (e.g. an NFC IC) 144. The smart object 104 additionally comprises one or more external electronic components 146 connected to the IC 144. A smart object 104 may also comprise an energy store 148 (e.g. a capacitor or battery) which is connected to a power management/harvesting circuit 150 which in the example shown in FIG. 1 is part of the IC 144.

In other examples the power management/harvesting circuit 150 may be separate from the IC 144, and may, for example, comprise a separate communications chip and harvesting rectifier. Where the power management/harvesting circuit 150 is separate from the IC 144, the power management/harvesting circuit 150 is connected to the antenna coil 142 and then is connected to the IC 144 and external electronic components 146 and to the energy store 148 (where provided) so that it can provide power when appropriate.

Figure 2:
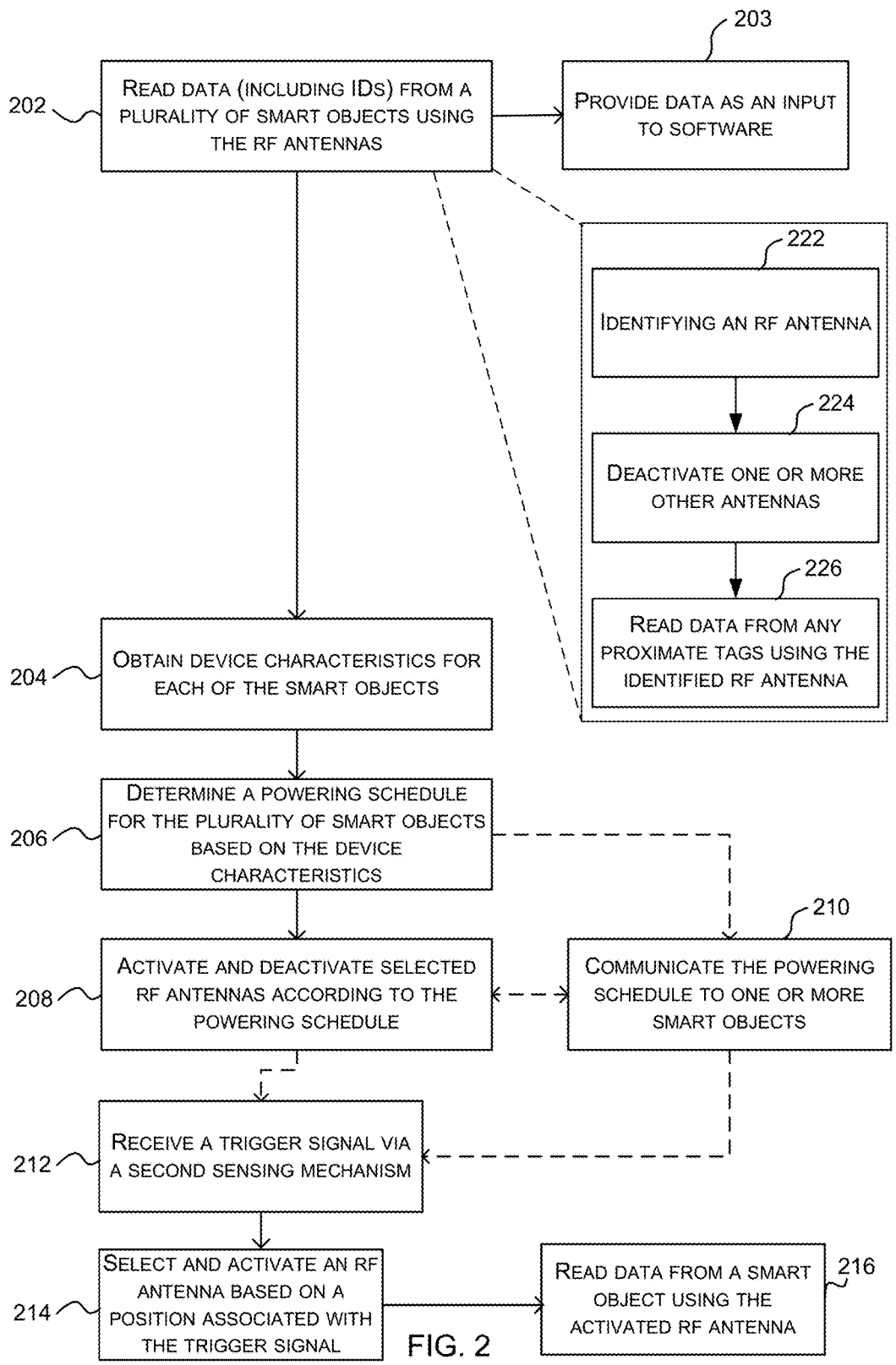
FIG. 2 is a flow diagram showing various example methods of operation of a reader device, such as the reader device shown in FIG. 1.

The operation of the reader device 102, and in particular the scheduler module 126, can be described with reference to FIG. 2. As shown in FIG. 2, the reader device 102 reads data, including one or more IDs, from one or more proximate smart objects 104 using the RF antennas 122 (block 202, e.g. where the reading may be performed by the sensing module 124). The reader device 102 obtains device characteristics (e.g. power usage data) for each of the identified smart objects (block 204, e.g. using the scheduler module 126). The device characteristics (e.g. power usage data) are then used along with knowledge of the available output power from the reader device 102 to determine a powering schedule for the plurality of smart objects (block 206, e.g. using the scheduler module 126). The powering schedule which has been determined (in block 206) is then implemented to perform active power management. This may be implemented by activating and deactivating selected RF antennas in accordance with the powering schedule and/or communicating some or all of the powering schedule to proximate smart objects (block 208), e.g. in the form of discrete commands or scheduling data.

In various examples where the smart object 104 comprises an energy store 148, the powering schedule may be referred to as a 'charging schedule' because it determines when the smart object 104 can harvest power from the electromagnetic field generated by the reader device to charge the energy store. However, as described above, the powering schedule may include more detail than just whether power can be harvested to charge a local energy store or not (e.g. exactly what harvested power can be used for, which elements within the smart device are operational etc.).

The reading of the data (in block 202) may comprise identifying an RF antenna (block 222), deactivating one or more other antennas (block 224) and then reading data from any proximate tags using the identified RF antenna (block 226). In some examples more than one RF antenna may be identified (in block 222) and used to read data from tags (in block 226) at the same time. Where more than one RF antenna is tuned and powered at the same time (in block 226), these antennas are selected (in block 222) to be sufficiently far apart that there is no effect on one powered RF antenna from any of the other powered RF antennas and this minimum spacing criterion for simultaneously active RF antennas may also be considered when generating the powering schedule (in block 206).

The device characteristics for one or more smart objects which are obtained (in block 204) by the reader device 102 (e.g. by the scheduler module 124) for a smart object comprises data identifying the power requirements of the smart object where this data may be static and pre-defined (e.g. an average power consumption of the smart object) or variable (e.g. a current power level, a current charge level in the energy store 148 or current power consumption of the smart object). In various examples, the device characteristics may also comprise a metric indicating the efficiency of the energy transfer from the reader device 102 to the smart object 104.

In various examples, the device characteristics may comprise an amount of data (e.g. sensor data) that the object has to communicate to the reader device where this may be a static amount (e.g. an average or maximum amount of data) or a variable amount (e.g. the amount of current stored data which needs to be communicated to the reader device). This amount of data that is to be communicated from the smart object to the reader device places constraints on the minimum activation time for an RF antenna proximate to the smart object as otherwise not all the data will be able to be communicated.

The device characteristics (e.g. power usage data) may be obtained (in block 204) using a look-up function, e.g. in a local database within the reader device 102 or a remote database accessed via the communication interface 128, where the look-up may be performed using the ID of the smart object as the key or index. A look-up function may be used to access static data (e.g. a predefined power requirement of a smart object). In various examples, however, some or all of the device characteristics may be variable and such device characteristics may be dynamically obtained based on measurements made by the reader device 102 and/or the smart object 104 when the IDs are read (in block 202). Such measurements may be taken periodically (e.g. every 10 seconds or 1 minute) or substantially continuously.

In an example, the reader device 102 may measure the RSSI or SNR when reading the data from a smart object (in block 202) and this may provide a metric indicating the efficiency of the power transfer to the smart object (e.g. with an increased RSSI or SNR indicating a more efficient transfer of power than in configurations when a lower value of RSSI or SNR was measured). In other examples, the smart object 104 may measure the power coupled into the antenna coil 142 when the data is read (in block 202) and this power measurement may provide a metric indicating the efficiency of the power transfer (e.g. with a larger coupled power indicating a more efficient power transfer). There are many factors which may affect the efficiency of the power transfer including, but not limited to, the position of the antenna coil in the smart object relative to the activated RF antenna, the relative dimensions of the antenna coil in the smart object and the activated RF antenna, the presence of debris between the antenna coil and the activated RF antenna, etc. The metric may be communicated back to the reader device 102 along with, or subsequent to, the ID (e.g. in block 202, block 204, or a subsequent iteration of block 202).

In various examples, the smart object 104 may communicate other device characteristics to the reader device 102 (e.g. static data instead of, or in addition to, variable data) and so the reader device 102 may obtain the device characteristics (in block 204) from data read from the smart object 104 along with the ID (in block 202) or through further communication with the smart object (in block 204). For example, the smart object 104 may communicate a device type or a predefined average power consumption of the smart object (which are examples of static data) and/or the current charge level of an internal energy store 148 or the current amount of stored data to communicate (which are examples of variable data).

The determination of the powering schedule (in block 206) is performed by the scheduler module 126 and may be performed in any way. In various examples, it comprises maintaining a list of smart objects 104 which are proximate to the reader device 102 and their device characteristics and polling each smart object periodically; although the frequency with which particular smart objects are polled, the RF antenna used and the length of any polling varies based on the device characteristics (including which RF antennas a smart object is proximate to). The powering schedule may therefore involve spatial segmentation of the RF antennas, matching of reader antenna dimensions to tag antennas, time multiplexing and/or scheduling of tag energizing and these techniques are described in more detail below.

Depending upon how the powering schedule is implemented, the powering schedule may only indicate the order and timing of the activation of the individual RF antennas from the plurality of RF antennas (e.g. antenna A for X ms, followed by antenna B for Y ms, etc.) and when activated any proximate smart objects may harvest power from the electromagnetic field generated by the RF antenna. In other examples, however, the powering schedule may additionally specify which smart objects are permitted to harvest power at any time (e.g. antenna A for X ms with power harvested by smart object 1, followed by antenna B for Y ms with power harvested by smart objects 2 and 3, etc.). In the latter example, the control of the power harvesting by individual smart objects may be implemented by sending individual commands to smart objects (in block 210) to instruct them to start or stop power harvesting and/or scheduling data may be communicated to smart objects such that the smart object can actively control whether they harvest power or not based on the received scheduling data.

By sending scheduling data, instead of a plurality of discrete commands, the number of communications between the reader device and smart objects is reduced and this may reduce the number of communication collisions (which can be dealt with by the communication protocol but may introduce delays into the communication process). The use of scheduling data which is implemented on the smart object may also enable use of additional low power states and reduce the overall power consumption of the smart object without significantly impacting the length of time when any input/output devices or other external electronics within a smart object is operational.

In various examples when determining the powering schedule, the powering of smart objects with lower current charge levels in their internal energy store may be prioritized (e.g. performed in advance of, or more regularly) over smart objects with higher current charge levels. In various examples when determining the powering schedule, a threshold may be applied to the metric indicating the efficiency of the power transfer from a particular RF antenna. Where the metric falls below a threshold, the smart object may be excluded from the powering schedule in relation to the particular RF antenna and may instead be powered by a different RF antenna (e.g. where the metric is higher). When determining the powering schedule (in block 206) position data for the various smart objects may also be used (e.g. as a proxy for the metric indicating the efficiency of the power transfer or in addition to the metric), where this position data identifies which smart objects are proximate to which RF antennas (e.g. as determined based on the IDs that a particular RF antenna reads in block 202).

In various examples when determining the powering schedule, the scheduler module 126 may profile and learn (or have the objects 104 report) how much power they consume. This may, for example, be based on how power hungry their circuit/sensors/actuators are and/or how often they tend to get used compared to other objects (e.g. in terms of a percentage utilization). In such examples, the scheduling (and hence charging) may be prioritized based on expected need instead of (or in addition to) current charge level.

The selective activation and deactivation of different RF antennas (in blocks 224 and 208) may be performed by the sensing module 124 and may comprise selectively tuning and detuning the RF antennas from the plurality of RF antennas where, when tuned, an RF antenna is tuned to the same frequency as the short-range wireless tags (e.g. tuned to match the antenna coil 142) in the smart objects 104 (e.g. 13.56 MHz for NFC). The deactivation of an RF antenna may be implemented in many different ways, for example by shorting the two halves of the loop via a transistor or making the tuning capacitors (which would otherwise tune the antenna at the right frequency) open-circuit (e.g. using a transistor). The selective tuning and detuning of antennas stops the antennas from coupling with each other (e.g. such that the power is not coupled into another antenna, which may then activate tags proximate to that other antenna and not the original, powered antenna).

In addition to, or instead of, selectively activating and deactivating antennas according to the powering schedule (in block 208), the reader device 102 may communicate individual commands or scheduling data based on the powering schedule to one or more of the smart objects (block 210). As described above, where individual commands are communicated, these are acted upon immediately by the receiving smart object and cause it to change operating state (e.g. to switch on/off the power harvesting or on/off the charging of a local energy store). In contrast, the scheduling data which is communicated to a smart object enables the smart object to actively control its operating state (e.g. when it harvests power from the RF antennas and/or for what purpose it can harvest power) in accordance with the powering schedule. Where the powering schedule is implemented by a smart object 104 (in addition to, or instead of, being implemented by the reader device 102), a clock within the smart object 104 may be synchronized with a clock within the reader device 102. This synchronization may, for example, be implemented by transmitting one or more time stamps from the reader device 102 to the smart object 104.

As shown in FIG. 2, as well as using the IDs (read in block 202) to generate the powering schedule (in block 206), the IDs and/or other data received from the smart object (in block 202) may also be provided as an input to software (block 203). The software may be running on the reader device 102 itself or on another computing device 106 with which the reader device 102 can communicate (e.g. via the communication interface 128). The other data received from a smart object may comprise state data, sensor data, etc. The data may be a value of a sensor, one or many bits of information, an analog signal, etc.

Figure 3:
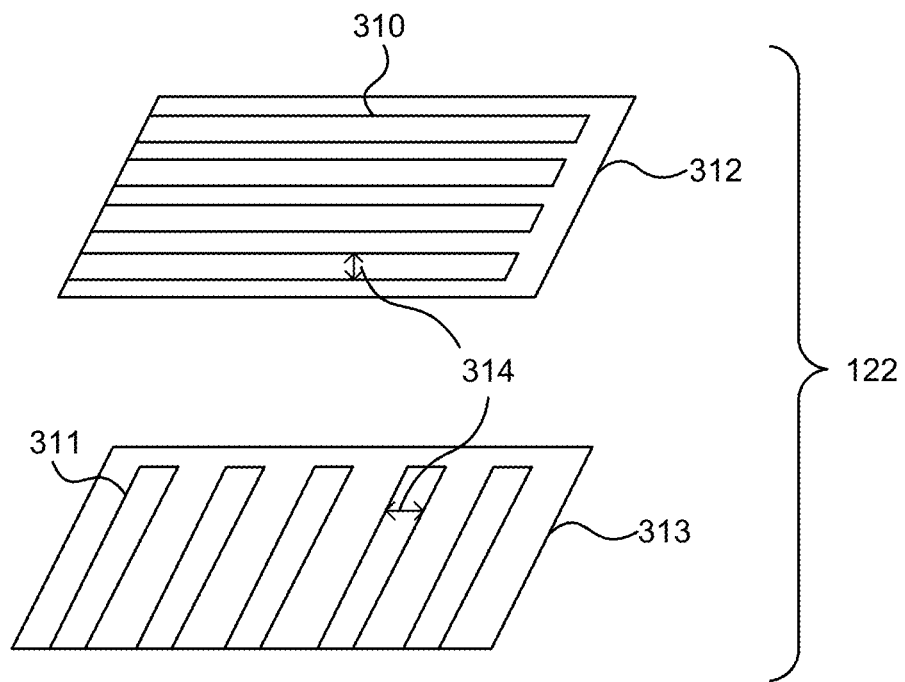
FIG. 3 is a schematic diagram showing an example implementation of a part of the reader device of FIG. 1 in more detail.

FIG. 3 shows an example arrangement of RF antennas 122 within the reader device 102. In this example the reader device 102 is a surface sensing device (e.g. as depicted in FIG. 1) and comprises a plurality of loop antennas. The plurality of RF antennas may comprise two sets of antennas 310, 311 in two separate layers 312, 313; however, in other examples, the array of RF antennas 308 may comprise only a single set of antennas (i.e. one of the two sets 310, 311 shown in FIG. 3 may be omitted). Two sets of antennas, as shown in FIG. 3 may be provided to enable the reader device 102 to distinguish between two objects at different locations but which are both proximate to the same RF antenna (such that if there was only one set of antennas, a single RF antenna would be able to read the tags in both objects). Such a row/column arrangement of RF antennas (comprising two sets of antennas 310, 311 as shown in FIG. 3) also enables the reader device to scale better (i.e. to larger sizes of reader device) and makes scanning across the area to find an object faster. In an alternative arrangement, a matrix (or grid) of individual antennas (e.g. m by n antennas arranged in a grid) may be used. Such a grid does not scale as well as the arrangement shown in FIG. 3, but may enable addressing of an object at a known location to be performed faster.

In the example shown in FIG. 3 the two sets of antennas 310, 311 are arranged perpendicular to each other in a row/column matrix such that one set may be referred to as the x-axis antennas and the other set may be referred to as the y-axis antennas. In other examples, however, the sets of antennas may be arranged such that they are not exactly perpendicular to each other but instead the antennas cross at a different angle or there may be only a single set of antennas (i.e. one of the sets 310, 311 is omitted). The two sets of antennas 310, 311 are separated by some insulation which may be in the form of an insulating layer (not shown in FIG. 3) or insulation over the wires that form one or both of the sets of antennas 310, 311.

In the example shown in FIG. 3, any smart object may be powered by at least two different RF antennas (e.g. one from each set of antennas) and when determining the powering schedule (in block 206), the relative merits of using each of the possible RF antennas (e.g. each of the at least two different RF antennas) may be assessed. This assessment may consider the metrics indicating the efficiency of the power transfer from each of the different RF antennas, the number of other smart objects which are proximate to each of the different RF antennas, the relative sizes of the RF antennas and the antenna coil in the smart object, etc.

As shown in FIG. 3, the RF antennas may be substantially rectangular loop antennas with a width (as indicated by arrows 314) which is close to the sizes of wireless tag used in any objects which are to be identified. For example, the width may be around 25 mm, with typical tag diameters being 17 mm, 22 mm, 25 mm, 30 mm and 35 mm, although larger tags are available (e.g. 50 mm diameters). Alternatively, other shapes of loop antenna may be used.

Figure 4:
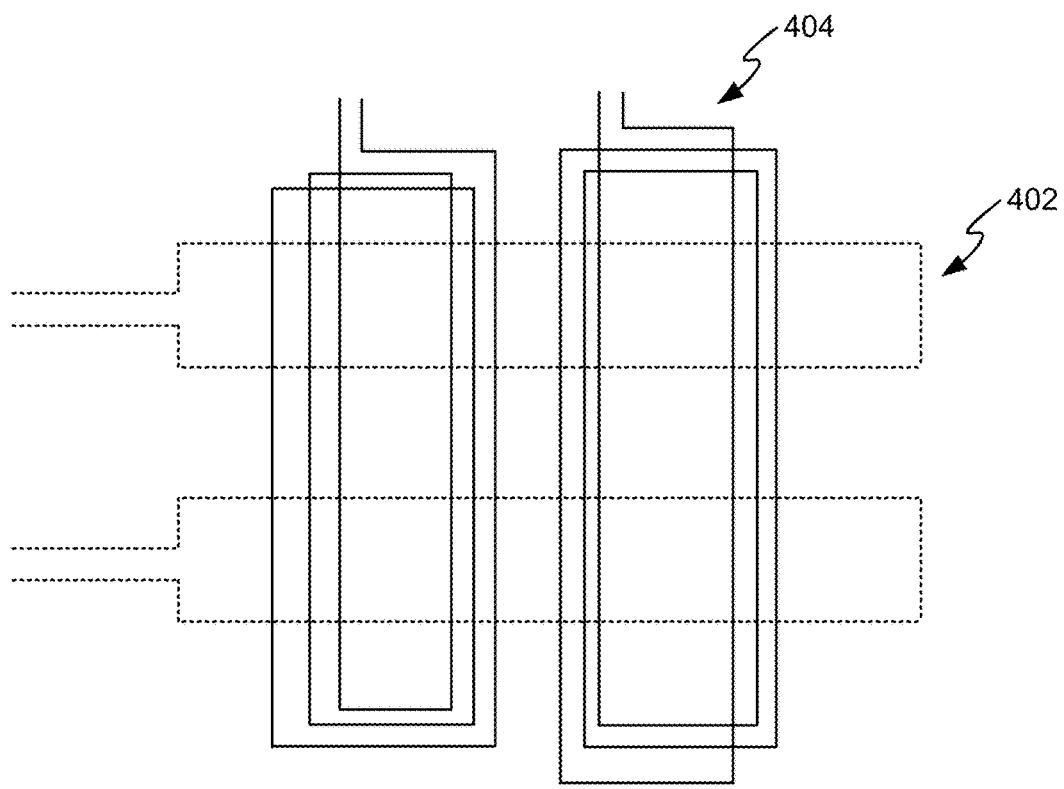
FIG. 4 is a schematic diagram showing another example implementation of a part of the reader device of FIG. 1 in more detail.

In the example shown in FIG. 3, the two sets of antennas 310, 311 are substantially the same; however, in other examples the two sets of antennas may be optimized for different purposes (i.e. communication and power delivery) or different antennas within each of the two sets of antennas may be optimized for different purposes. An example arrangement of antennas is shown in FIG. 4 which comprises one set of antennas 402 (e.g. the x-axis antennas) which are optimized for communication and may have fewer turns and be easier to manufacture and a second set of antennas 404 (e.g. the y-axis antennas) which are optimized for coupling power to proximate short-range wireless tags (e.g. in smart objects 104) and comprise thicker tracks, more turns, etc. The second set of antennas 404 may be optimized in any way that improves the power transfer to all or some of the smart objects and thicker tracks and more turns are just two examples of optimizations. In addition to, or instead, the antennas may have a different shape, different density of coils (e.g. such that there are different numbers of antennas covering the same surface, in various examples with overlapping loops/coils, or such that there are different numbers of smaller antennas with thinner dimensions/pitch), etc. This second set of antennas 404 may be larger and/or more difficult to manufacture than the first set of antennas 402.

In various examples, an antenna or a set of antennas (e.g. set of antennas 404) may be used only for power transfer and not for communications (e.g. permanently or for a period time) and in such examples the antenna or set of antennas may be connected (permanently or temporarily) to an oscillator operating at the appropriate frequency for the tags (e.g. 13.56 MHz for NFC) instead of being connected to the sensing module within the reader device 102.

In a variation on the example shown in FIG. 4, the different sets of antennas may comprise antennas of different sizes (e.g. the antennas in one set may be smaller than the antennas in the other set, or alternate antennas within a set may be of a different size) and then, where a smart object is proximate to two or more antennas, the antenna which is used to power the smart object may be selected based on the size of the antenna coil 142 in the smart object (e.g. so that the RF antenna with dimensions that most closely match the antenna coil is used).

The sensing module 124 is coupled to the plurality of RF antennas 122 and is configured to selectively tune and detune the RF antennas in the array (e.g. as described above with reference to FIG. 2). For example, the sensing module 122 may deactivate all but a selected one or more RF antennas and then power the selected RF antennas such that they can activate and read any proximate wireless tags (where the reading of tags using a selected antenna may be performed in the same way as a conventional NFC or RFID reader). Where more than one RF antenna is tuned and powered at the same time, these antennas are selected to be sufficiently far apart that there is no effect on one powered RF antenna from any of the other powered RF antennas. The deactivation of an RF antenna may be implemented in many different ways, for example by shorting the two halves of the loop via a transistor or making the tuning capacitors (which would otherwise tune the antenna at the right frequency) open-circuit (using a transistor). This selective tuning and detuning of the RF antennas stops the antennas from coupling with each other (e.g. such that the power is not coupled into another antenna, which may then activate tags proximate to that other antenna and not the original, powered antenna).

Figure 5A:
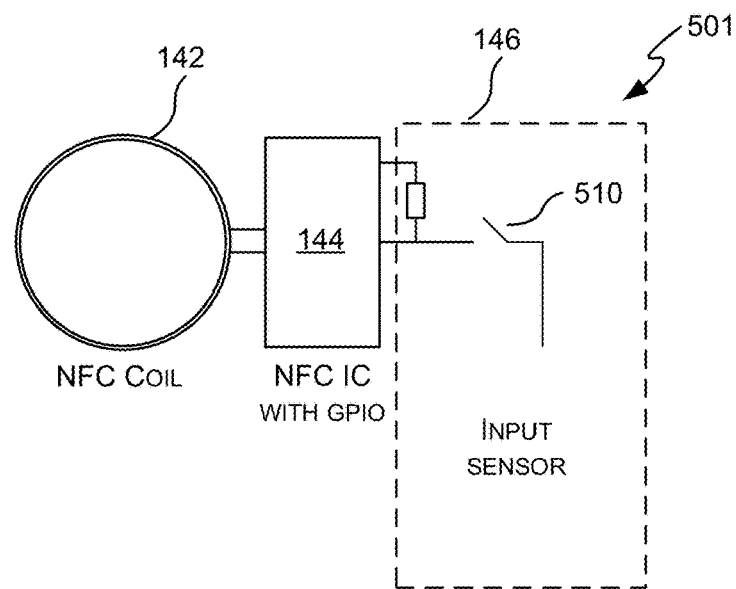
FIGS. 5A and 5B show two schematic diagrams of example implementations of smart object, such as shown in FIG. 1, in more detail.
Figure 5B:
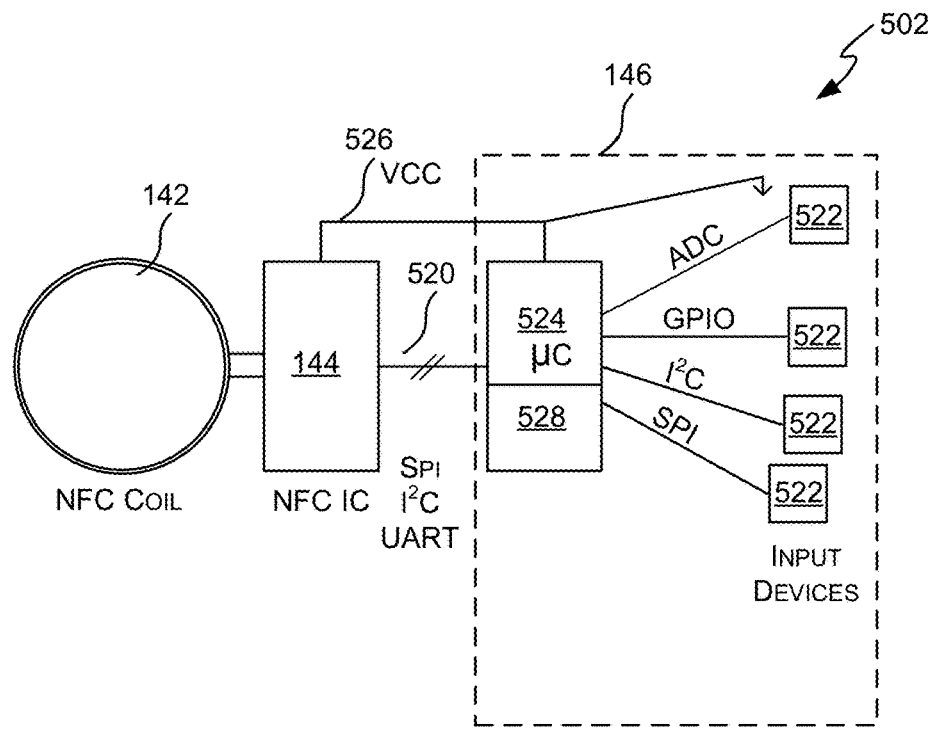

As described above and shown in FIG. 1, a smart object 104 comprises an antenna coil 142, an IC (e.g. an NFC IC) 144 and one or more external electronic components 146 and two examples 501, 502 are shown in more detail in FIGS. 5A and 5B. A smart object 104 may also comprise an energy store 148 such as a capacitor (e.g. a ceramic capacitor or an electric double-layer capacitor) or a battery (e.g. a lithium secondary cell); however, this is not shown in the examples in FIGS. 5A and 5B. In the first example 501 in FIG. 5A, the IC 144 has GPIO which are directly connected to an input device which in the example shown is an input sensor 510. In the second example 502 in FIG. 5B, the IC 144 has a serial communication channel 520 connected to one or more input devices 522 through a microcontroller 524 (although in other examples, the input devices 522 may be connected to the communication channel 520 and the microcontroller 524 may be omitted). As described above, power for the external electronic components 146 is harvested from the field emitted by the reader device 102 (e.g. by the power management/harvesting circuit 150 shown in FIG. 1) and the IC 144 may rectify and output a voltage source 526 to provide this power (this is in contrast to the arrangement shown in the first example 501 in which this voltage source is generated and consumed internally by the NFC chip 144).

The examples 501, 502 shown in FIGS. 5A and 5B comprise one or more input devices 510, 522 connected directly or indirectly (e.g. via a microcontroller 524) to the IC 144. These input devices may, for example, be sensors (e.g. input sensor 510) which may detect a state of the smart object 104 (e.g. whether a flap or door on the smart object 104 is open or closed) or user input elements (e.g. buttons, sliders, switches or dials). In examples where the input device is a switch or button, its state may be read by a digital input pin on the microcontroller 524 and in examples where the input device is an analog control (such as a dial or slider), its state may be read by an ADC pin. As shown in the second example 502, the smart object may comprise a small amount of memory 528 (e.g. flash memory) for storing sensor data prior to communicating it to a reader device. In addition, or instead, the memory 528 may be used to store other data (e.g. state data, such as a current level of charge of an internal energy store) prior to communication to the reader device. In other examples, a smart object 104 may comprise one or more output devices (e.g. in addition to, or instead of, the one or more input devices), such as a speaker or buzzer (to play a sound), a low power display, one or more LEDs, a mechanical actuator (e.g. a motor, servo or piezo actuator) etc. As with the input devices, the output devices may be connected directly or indirectly (e.g. via a microcontroller) to the IC 144.

Figure 6:
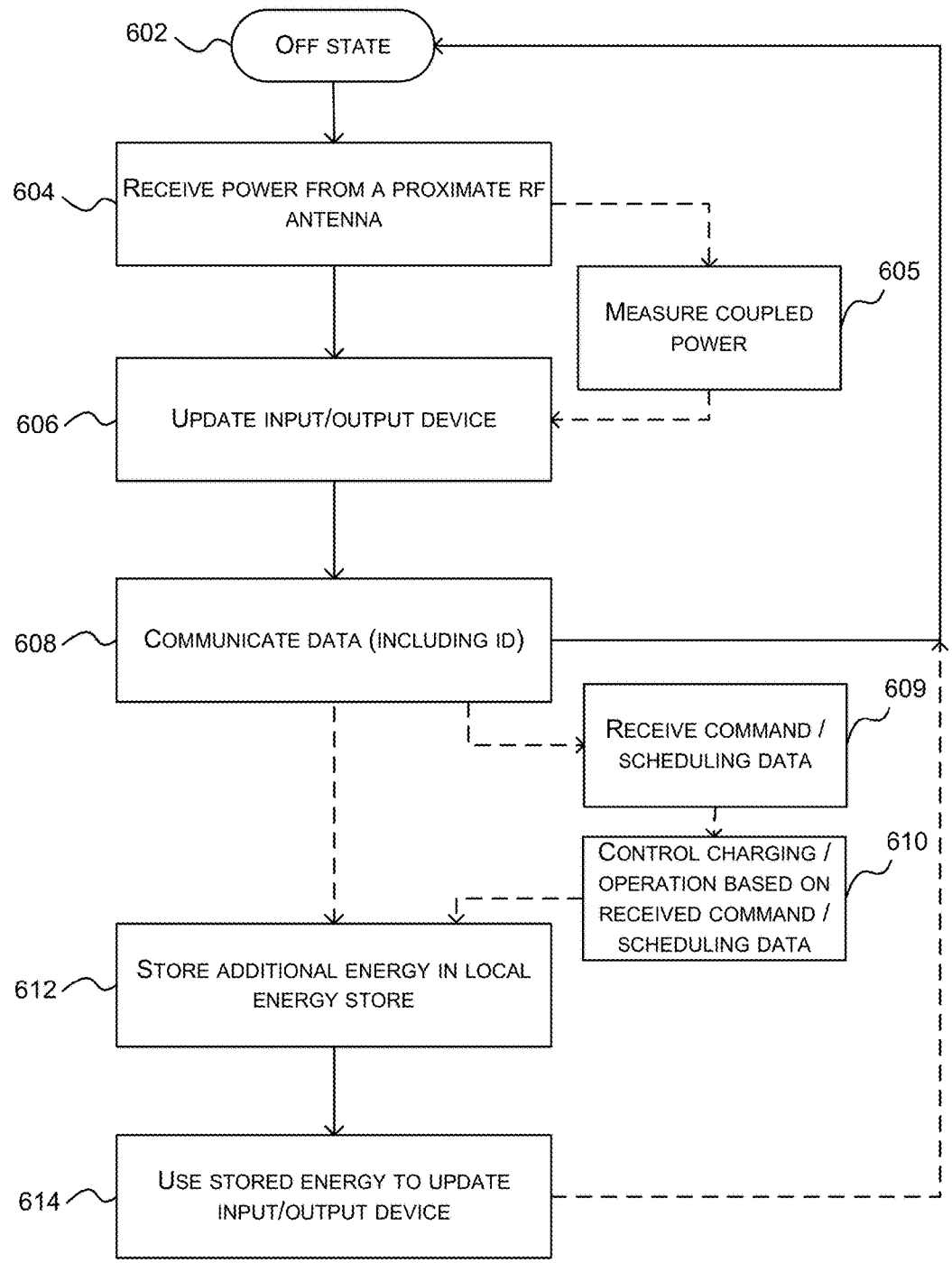
FIG. 6 is a flow diagram showing various example methods of operation of a smart object, such as the smart objects shown in FIGS. 1 and 5.

Various example methods of operation of a smart object 104 (e.g. such as one of the examples shown in FIGS. 5A and 5B) can be described with reference to FIG. 6.

In a first example, the smart object 104 does not comprise an internal (i.e. local) energy store and initially the smart device 104 is in an off-state (block 602), in response to receiving power from a proximate RF antenna (block 604), the smart device 104 switches into an on-state in which it can power the external electronic components 146 and hence update any input/output (I/O) devices (block 606) and it also communicates data, including the ID of the short-range wireless tag in the smart object (block 608). When the smart object no longer receives power from a proximate RF antenna, the smart object returns to the off-state (block 604). In a second example, the smart object 104 may additionally measure the coupled power (block 605) and communicate a metric indicating the coupling or coupling efficiency along with the ID (in block 608).

In a third example, the smart object 104 additionally comprises an internal energy store 148 and so does not necessarily return immediately to the off state when it is no longer receiving power from a proximate RF antenna. Instead, whilst the smart object is receiving power from a proximate RF antenna, energy may be stored in the local energy store (block 612) and this is then subsequently used when the smart object is no longer receiving power from a proximate RF antenna, to update any input/output devices (block 614). In this third example, the smart object 104 may measure and communicate the coupled power (in blocks 605-606, as in the second example above) or it may not perform this measurement (block 605 omitted, as in the first example above).

The presence of the internal energy store 148 means that in this third example the smart object has three possible states as set out in the table below:

| | A (ON) | B | C (OFF) |
|---|---|---|---|
| Proximate antenna activated? | Yes | No | No |
| Antenna coil tuned? | Yes | Yes/No | Yes/No |
| Harvesting power to charge energy store? | Yes | No | No |
| Harvesting power for communication? | Yes | No | No |
| Harvesting power for external electronics? | Yes | No | No |

-continued

|  | A (ON) | B | C (OFF) |
|---|---|---|---|
| Communication circuitry within IC active? | Yes | Yes/No | No |
| External electronics active? | Yes | Yes | No |

In the first state, state A, is the on-state and in this state the smart object 104 is receiving power from a proximate RF antenna, its antenna coil 142 is tuned, it is charging the local energy store 148 from harvested power, its communication circuitry (which are within the IC 144) and external electronics 146 (e.g. I/O devices) are active (e.g. any I/O devices can be updated). When the smart object is no longer receiving power from a proximate RF antenna and whilst there is sufficient power in the local energy store, the smart object can enter an intermediate state, state B, in which no power is harvested but the external electronics remain active using the power in the local energy store. Depending upon the implementation, the smart object may or may not be able to communicate data to a reader device 102 when in this intermediate state and the antenna coil 142 may or may not be detuned. When the power in the local energy store is exhausted, the smart object reverts to the off-state, state C; however, the powering schedule may cause the smart object 104 to revert back to state A from state B before the local energy store is exhausted to enable to further charging to occur and hence to minimize the time spent in the off-state, state C.

It will be appreciated that if the antenna coil 142 is detuned, the smart object cannot communicate with a reader device even if the communication circuitry (which is part of the IC 144) is active (i.e. powered). Consequently, in many examples, if the antenna coil 142 is detuned, the communication circuitry is powered down (i.e. not active) as this reduces the power consumption of the smart object and extends the time before the local energy store is exhausted.

In the first, second and third examples, all the scheduling of when particular smart objects are on/off is performed by the reader device 102 (e.g. as described above with reference to FIG. 2).

In the fourth example (in contrast with the earlier examples), the smart object receives a command or scheduling data from the reader device (block 609) and uses this data to control the operation of the smart object (block 610). In particular, based on the command or scheduling data, the smart object controls whether energy is harvested from the electromagnetic field and when it is harvested, the purposes it can be used for (in block 612), e.g. whether the harvested energy can be used to charge a local energy store or whether it can only be used to power the communication circuitry and/or external electronics.

In this fourth example, the smart object has one or more extra possible states (e.g. any one or more of states A1, A2 and A3), for example as set out in the table below:

|  | A (ON) | A1 | A2 | A3 | B | C (OFF) |
|---|---|---|---|---|---|---|
| Proximate antenna activated? | Yes | Yes | Yes | Yes | No | No |
| Antenna coil tuned? | Yes | Yes | Yes | Yes/No | Yes/No | Yes/No |
| Harvesting power to charge energy store? | Yes | No | No | No | No | No |
| Harvesting power for communication? | Yes | Yes | No | No | No | No |

|  | A (ON) | A1 | A2 | A3 | B | C (OFF) |
|---|---|---|---|---|---|---|
| Harvesting power for external electronics? | Yes | Yes | Yes | No | No | No |
| Communication circuitry within IC active? | Yes | Yes | Yes/No | Yes/No | Yes/No | No |
| External electronics active? | Yes | Yes | Yes | Yes | Yes | No |

Three of the states (states A, B and C) are the same as in the third example and are described above. The smart object comprises at least one additional state (at least one of states A1, A2 and A3). In states A1 and A2, the smart object still harvests power but does not charge the local energy store and hence has a reduced power consumption compared to the on-state, state A. Such a state (e.g. state A1 and/or A2) may be referred to as a 'low power consumption state' because whilst it still performs energy harvesting, the amount of energy harvested is reduced compared to the on-state, state A.

In a first additional state, state A1, the smart object harvests power for communication and to power the external electronics but not to charge the local energy store. The communication circuitry and external electronics are therefore active and the smart object is capable of communicating with the reader device 102. In a second additional state, state A2, the smart object harvests power only to power the external electronics (and not to power the communications circuitry or to charge the energy store). The smart object may still be capable of communicating with the reader device, but only where the communications circuitry is powered by the local energy store. In some examples, the smart object may have one or both of these additional states (i.e. state A1 and/or state A2).

In state A3, the proximate RF antenna is still active (unlike in state B), but no energy harvesting is performed (like in state B and unlike states A, A1 and A2) and this may be as a consequence of the antenna coil being detuned. Like in state B, when in state A3, the external electronics are active and are powered by the local energy store. If in state A3 the antenna coil is detuned (e.g. to prevent any energy harvesting), then the communications circuit is not active. If, however, the antenna coil is not detuned in state A3, the communications circuit may be active and powered by the local energy store.

In this fourth example, the smart object switches between the available operating states (e.g. states A, B, C and one or more of states A1, A2 and A3) based on commands or scheduling data received from the reader device 102. If, when operating in state A2 or A3, the local energy store becomes exhausted, the communication circuitry may stop working and the smart object will be no longer able to communicate with the reader device until the state of operation reverts back to state A or A1 and this may be triggered by the powering schedule or the smart object may periodically revert back to state A. If when operating in state A3 or B the power in the local energy store is exhausted, the smart object reverts to the off-state, state C. The powering schedule may, however, cause the smart object 104 to revert back to a higher level state (e.g. state A, A1 or A2) from state A3 or B before the local energy store is exhausted. If the smart object reverts back to state A, this enables further charging to occur, whereas if the smart object reverts back to state A1 or A2 before the local energy store is exhausted, the local energy store cannot be charged but additional functionality is enabled (e.g. communication and/or updating of the input/output devices). Through use of the powering schedule to switch between states, the time spent in the off-state, state C, may be minimized.

In examples where it is not possible to resolve a conflict between the power requirements of multiple smart objects using a powering schedule (e.g. because the smart objects are not capable of implementing the required schedule and there are too many smart objects proximate to an antenna to implement a powering schedule by the reader device alone), the reader device 102 may raise an error message and pass this to the software which takes data from the smart objects as an input. This error message may be communicated by the software to a user (e.g. through a graphical user interface) and instruct the user to move one or more of the smart objects relative to the reader device.

As shown from the examples above, a smart object 104 may have an operating state in which the external electronics 146 are active and the communication circuitry is not active and/or the antenna coil is detuned and/or the proximate RF antenna is not activated. In such an operating state, the smart object cannot communicate with the reader device 102. If, however, the smart object has an urgent need to communicate (e.g. when any memory 528 within the smart object is full, or when a particular event is detected using an input device 510, 522), the smart object 104 may autonomously revert back to a state in which it is capable of communicating (e.g. such that the antenna coil is tuned), even if this conflicts with the powering schedule. However, unless a proximate RF antenna is activated by the reader device 102, it is still not possible for the smart object 104 to communicate with the reader device 102.

In various examples, the reader device may comprise two different sensing systems (e.g. a plurality of RF antennas, as described above, and a capacitive sensing electrode array) and the smart object 104 may use the second sensing system (i.e. the sensing system other than the plurality of RF antennas) to signal to the reader device that it needs to communicate data, as shown in FIG. 2. In response to receiving a trigger signal (block 212, e.g. by the sensing module 124 or scheduler module 126) and if the trigger signal includes positional data for the smart object, an RF antenna which is proximate to the smart object is identified (e.g. based on the positional data in the trigger signal, e.g. by the sensing module 124 or scheduler module 126) and activated (block 214, e.g. by the sensing module 124) and data can then be read from the smart object (block 216 e.g. by the sensing module 124). If there is no positional information associated with the trigger signal (e.g. if the second sensing system does not detect position but instead only provides a trigger signal which is the same irrespective of the location of the smart object), then in response to receiving the trigger signal (in block 212) the reader device may scan through all of the RF antennas in turn and hence the smart object will be able to communicate when an RF antenna proximate to is it activated.

Figure 7:
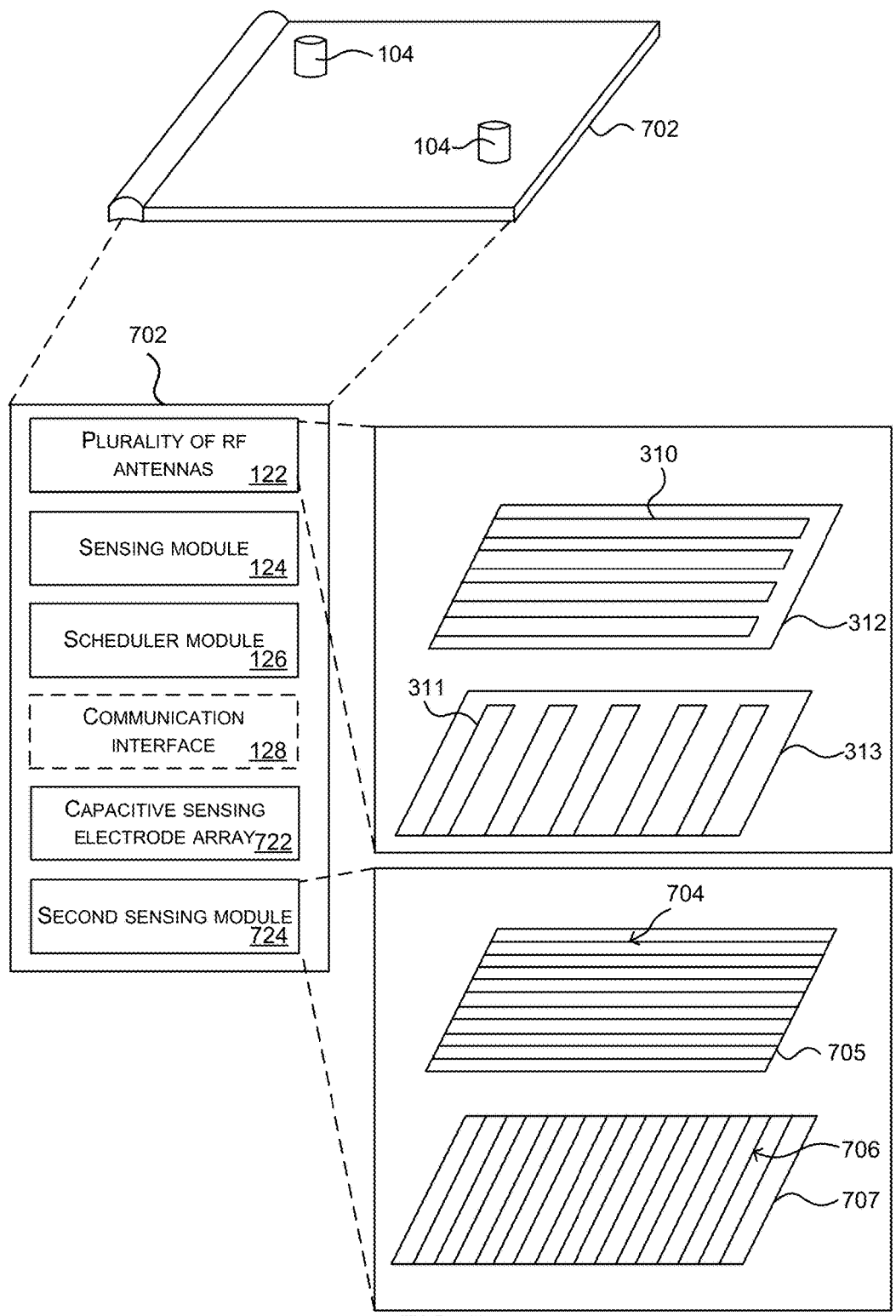
FIG. 7 shows a schematic diagram of a multi-modal sensing surface.

FIG. 7 shows a multi-modal sensing surface 702 which combines a reader device 102 (as described above) with a second sensing modality and in this example, the second sensing modality is provided by a capacitive sensing electrode array 722 coupled to a second sensing module 724. The sensing surface 702 comprises a flat area which is a multi-layer structure comprising one array overlaid over the other array. In various examples, the capacitive sensing electrode array 722 may be above the array of RF antennas 122 (i.e. the capacitive sensing electrode array 722 is closer to the touch surface than the array of RF antennas 122). Having the capacitive sensing electrode array 722 closer to the touch surface than the array of RF antennas 122 enables the array of RF antennas to provide a shield beneath the capacitive sensing layer (e.g. to prevent false detection caused by objects underneath the sensing surface).

In various examples the two arrays 722, 122 may be substantially the same size so that the arrays overlap completely. In other examples, however, the two arrays may not be the same size (e.g. the capacitive sensing electrode array 722 may be larger than the array of RF antennas or vice versa) and/or the arrays may be partially offset from each other so that they do not overlap completely and such that there are portions of the sensing surface which are multi-modal (i.e. where the two arrays overlap) and there are portions of the sensing surface which are not (i.e. where there is only one of the two arrays 722, 122).

The capacitive sensing electrode array 722 comprises a first set of electrodes 704 in a first layer 705 and a second set of electrodes 706 in a second layer 707. In the example shown in FIG. 7 the two sets of electrodes 704, 706 are arranged perpendicular to each other such that one set may be referred to as the x-axis electrodes and the other set may be referred to as the y-axis electrodes. In other examples, however, the sets of electrodes may be arranged such that they are not exactly perpendicular to each other but instead the electrodes cross at a different angle. The sets of electrodes 704, 706 are separated by some insulation which may be in the form of an insulating layer (not shown in FIG. 7) or insulation over the wires that form one or both of the sets of electrodes 704, 706.

The array of RF antennas 122 comprises a plurality of loop antennas and the example in FIG. 7 the array 122 comprises two sets of antennas 310, 311 in two separate layers 312, 313 as described above with reference to FIG. 3; however, in other examples, the array of RF antennas 122 may comprise only a single set of antennas (i.e. one of the two sets 310, 311 shown in FIG. 3 may be omitted).

The two arrays 722, 122 are separated by a distance (e.g. by an insulating layer also not shown in FIG. 7) in order to reduce the mutual capacitance between the capacitive sensing electrodes and the 'ground' layer provided by the NFC antennas.

The second sensing module 724 (which may comprise a microprocessor control unit, MCU) is coupled to the capacitive sensing electrode array 722 and is configured to detect an increase in the capacitance between electrodes in the array (i.e. an increase in mutual capacitance). In various examples, the second sensing module 724 may also be configured to detect a decrease in the capacitance between electrodes in the array. A decrease of mutual capacitance between electrodes (i.e. between one or more electrodes in the first set of electrodes 704 and one or more electrodes in the second set of electrodes 706) may be used to detect a user's fingers in the same way as conventional multi-touch sensing. Unlike conventional multi-touch sensing, however, the first sensing module 702 can detect an increase in the capacitance between electrodes in the array. An increase in mutual capacitance between electrodes (i.e. between one or more electrodes in the first set of electrodes 704 and one or more electrodes in the second set of electrodes 706) is used to detect the position, and in various examples, also the shape, of a conductive object, such as a wireless tag (e.g. an NFC or RFID tag) in a non-conductive housing or other object formed from a conductive material (without a tag). Unlike a user's finger, such an object has no connection to ground and instead it capacitive couples adjacent electrodes (consequently, the object does not need to have a high electrical conductivity and instead can be made from, or include, any conductive material).

As described above, in response to detecting an increase in capacitance at a particular location on the capacitive sensing electrode array 722, the second sensing module 724 sends a trigger signal, including the positional data, to the sensing module 124.

In the multi-modal sensing surface 702, the sensing module 124 operates as described above with reference to FIG. 2 and may be further configured to connect all the RF antennas to ground when the second sensing module 724 is operating. This prevents the capacitive sensors from sensing activity on the non-touch-side of the sensing mat (e.g. legs under the table) and in examples where the second sensing module 724 can detect both an increase and a decrease in mutual capacitance, connecting the RF antennas to ground whilst sensing using the capacitive sensing electrode array 722 provides the capacitive return path to ground (which completes the circuit of the user's finger to the sensing electrodes to ground and to the user's body).

The sensing module 124, scheduler module 126 and second sensing module 724 described herein may be implemented in software or alternatively, or in addition, the functionality described herein may be performed, at least in part, by one or more hardware logic components. For example, and without limitation, illustrative types of hardware logic components that are optionally used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), Graphics Processing Units (GPUs).

Figure 8:
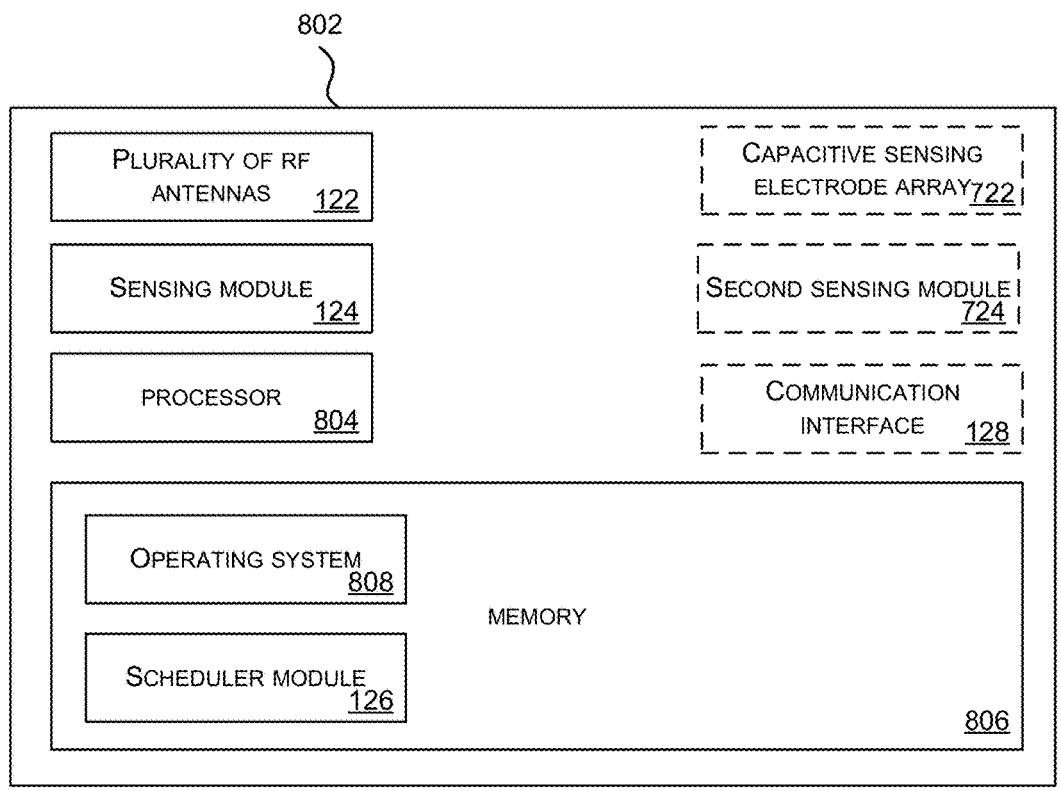
FIG. 8 is a schematic diagram showing a further example implementation of a reader device, such as the reader device shown in FIG. 1.

FIG. 8 is a schematic diagram showing a further example implementation of a reader device 802 in which the scheduler module 126 is implemented at least partially in software. The reader device 802 may operate in the same way as the reader device 102 shown in FIG. 1 and described above or it may be a part of a multi-modal sensing surface (e.g. as shown in FIG. 7) and operate as described above.

The reader device 802 comprises one or more processors 804 which are microprocessors, controllers or any other suitable type of processors for processing computer executable instructions to control the operation of the device in order to implement the methods described above. Although a single processor 804 is shown in FIG. 8, it will be appreciated that there may be additional processors (e.g. there may be a processor in the sensing module 124 and/or second sensing module 724). In some examples, for example where a system on a chip architecture is used, the processors 804 include one or more fixed function blocks (also referred to as accelerators) which implement a part of the method of operation of the reader device (e.g. the scheduling operation) in hardware (rather than software or firmware). Platform software comprising an operating system 808 or any other suitable platform software may be provided at the computing-based device to enable application software, such as the scheduler module 126 to be executed on the device, or the scheduler module 126 may be able to be executed without the presence of an operating system.

The computer executable instructions are provided using any computer-readable media that is accessible by reader device 802. Computer-readable media includes, for example, computer storage media such as memory 806 and communications media. Computer storage media, such as memory 806, includes volatile and non-volatile, removable and non-removable media implemented in any method or technology for storage of information such as computer readable instructions, data structures, program modules or the like. Computer storage media includes, but is not limited to, random access memory (RAM), read only memory (ROM), erasable programmable read only memory (EPROM), electronic erasable programmable read only memory (EEPROM), flash memory or other memory technology, compact disc read only memory (CD-ROM), digital versatile disks (DVD) or other optical storage, magnetic cassettes, magnetic tape, magnetic disk storage or other magnetic storage devices, or any other non-transmission medium that is used to store information for access by a computing device. In contrast, communication media embody computer readable instructions, data structures, program modules, or the like in a modulated data signal, such as a carrier wave, or other transport mechanism. As defined herein, computer storage media does not include communication media. Therefore, a computer storage medium should not be interpreted to be a propagating signal per se. Although the computer storage media (memory 806) is shown within the reader device 802 it will be appreciated that the storage is, in some examples, distributed or located remotely and accessed via a network or other communication link (e.g. using communication interface 128).

Although the present examples are described and illustrated herein as being implemented in system where the reader is a flat surface, the system described is provided as an example and not a limitation. As those skilled in the art will appreciate, the present examples are suitable for application in a variety of different types of systems and the reader device described herein may have any shape (e.g. curved, bent, etc.) and may be integrated into any larger device (e.g. into a computing device, a consumer appliance, etc.). It will also be appreciated that whilst the smart objects 104 are all depicted as cylindrical in shape, the smart objects 104 may have any shape and size and in some examples may comprise more than one short-range wireless tag.

In examples where a smart object 104 comprises more than one wireless tag, the method may further comprise switching between tags to change the coupling characteristics (e.g. in block 610).

Using the methods described herein, power consumption of the smart object may be reduced/minimized whilst still enabling the external electronics within a smart object to operate all or nearly all of the time. The power consumption of the smart object is controlled by the reader device through controlling the sequence and timing of the activation of the various RF antennas and/or through the provision of commands and/or scheduling data to proximate smart objects. Using the methods described herein, the reader device can therefore perform active power management of the whole system (comprising the reader device and a plurality of smart objects).

As described above, in various examples, a smart object has one or more operating states in which it consumes less power from the reader device than when it is in the fully on state (state A). The reduction in power may be implemented by detuning the antenna within the smart object and/or limiting the power harvesting in some way (e.g. such that there is no power harvesting or the power that is harvested can only be used for particular tasks and not to charge an internal energy store).

As well as improving power management within the system, the methods described herein may additionally speed up the discovery of a new smart object when it is placed in proximity to the reader device. If one or more of the existing smart objects are in a low power mode and are not trying to extract power or interfere with the communication, there may be less collisions in the communications and the ID of the tag in the new object may be successfully read more quickly.

A first further example provides a reader device for short-range wireless tags comprising: one or more RF antennas; a sensing module coupled to the RF antennas and arranged to selectively activate and deactivate one or more of the RF antennas and to read data from a plurality of objects comprising short-range wireless tags which are proximate to an active RF antenna; and a scheduler module arranged to obtain device characteristics for the plurality of objects based at least in part on data read by the sensing module and to generate a powering schedule for the plurality of objects based at least in part on the device characteristics, and wherein the sensing module is further arranged to implement the powering schedule generated by the scheduler module.

The sensing module may be arranged to implement the powering schedule by selectively activating and deactivating one or more of the RF antennas according to the powering schedule.

The sensing module may be arranged to implement the powering schedule by communicating at least a part of the powering schedule to the short-range wireless tag in one of the plurality of objects.

The sensing module may be arranged to communicate a sequence of commands to the short-range wireless tag in one of the plurality of objects, each command specifying a change in operating state of the object.

The sensing module may be arranged to communicate scheduling data to the short-range wireless tag in one of the plurality of objects and wherein the scheduling data, when implemented in the object, causes the object to switch between operating states at predefined times.

The data read from the plurality of objects may comprise an identifier for each object and wherein the scheduler module is arranged to obtain device characteristics for an object by performing a database look-up using the identifier for the object.

The device characteristics for an object may comprise a measured or a pre-defined power consumption of the object in one or more different operating states.

The device characteristics for an object may comprise a parameter indicating a level of charge within an energy store in the object and the data read from the object comprises the parameter.

The device characteristics for an object may comprise a metric indicating the efficiency of power transfer from the reader device to the short-range wireless tag in the object.

The data read from the object may comprise the metric indicating the efficiency of power transfer and wherein the metric is based on measurements made within the object.

The metric indicating the efficiency of power transfer for the object may be generated by the reader device based on measurements made when reading data from the object.

The one or more antennas may comprise a plurality of RF antennas.

The one or more RF antennas may comprise: a first array of RF antennas in a first plane; and a second array of RF antennas in a second plane parallel to and spaced from the first plane.

The one or more RF antennas may comprise: a first set of RF antennas optimized for communication with proximate short-range wireless tags; and a second set of RF antennas optimized for power transfer to proximate short-range wireless tags.

The reader device may further comprise: a capacitive sensing electrode array; and a second sensing module coupled to the capacitive sensing electrode array and arranged to detect an increase in capacitance between electrodes in the array.

The second sensing module may be arranged to generate a trigger signal in response to detecting an increase in capacitance between electrodes in the array at a position on the capacitive sensing electrode array and wherein the reader device, is arranged, in response to receiving the trigger signal, to select and activate an RF antenna based on the detected position of the increase in capacitance.

A second further example provides an object comprising: a short-range wireless tag comprising an antenna coil and an integrated circuit; one or more external electronic components; and an energy store, wherein the integrated circuit is arranged to harvest power from an electromagnetic field generated by a proximate reader device and to selectively charge the energy store using the harvested power based at least in part on scheduling data received from the proximate reader device.

The integrated circuit may be further arranged to selectively tune and detune the antenna coil based at least in part on scheduling data received from the proximate reader device.

The integrated circuit may be further arranged to selectively use the harvested power to power the one or more external electronic components based at least in part on scheduling data received from the proximate reader device.

A third further example provides a method of operating a reader device comprising: reading data from a plurality of proximate objects comprising short-range wireless tags using one or more RF antennas in the reader device; obtaining device characteristics for each of the plurality of proximate objects based at least in part on the data read from the plurality of proximate objects; generating a powering schedule for the plurality of proximate objects based at least in part on the device characteristics; and implementing the powering schedule using the one or more RF antennas.

Implementing the powering schedule using the one or more RF antennas may comprise: selectively activating and deactivating RF antennas from the one or more RF antennas according to the powering schedule; and/or communicating at least a part of the powering schedule to one or more of the plurality of proximate objects for implementation by the proximate objects.

The term 'computer' or 'computing-based device' is used herein to refer to any device with processing capability such that it executes instructions. Those skilled in the art will realize that such processing capabilities are incorporated into many different devices and therefore the terms 'computer' and 'computing-based device' each include personal computers (PCs), servers, mobile telephones (including smart phones), tablet computers, set-top boxes, media players, games consoles, personal digital assistants, wearable computers, and many other devices.

The methods described herein are performed, in some examples, by software in machine readable form on a tangible storage medium e.g. in the form of a computer program comprising computer program code means adapted to perform all the operations of one or more of the methods described herein when the program is run on a computer and where the computer program may be embodied on a computer readable medium. The software is suitable for execution on a parallel processor or a serial processor such that the method operations may be carried out in any suitable order, or simultaneously.

This acknowledges that software is a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions are optionally distributed across a network. For example, a remote computer is able to store an example of the process described as software. A local or terminal computer is able to access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a digital signal processor (DSP), programmable logic array, or the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The operations of the methods described herein may be carried out in any suitable order, or simultaneously where appropriate. Additionally, individual blocks may be deleted from any of the methods without departing from the scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

The term 'subset' is used herein to refer to a proper subset such that a subset of a set does not comprise all the elements of the set (i.e. at least one of the elements of the set is missing from the subset).

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification.

The invention claimed is:

1. A reader device for short-range wireless tags comprising:
   one or more RF antennas;
   a sensing module coupled to the RF antennas and arranged to selectively activate and deactivate one or more of the RF antennas and to read data from a plurality of objects comprising short-range wireless tags which are proximate to an active RF antenna; and
   a scheduler module arranged to obtain device characteristics for the plurality of objects based at least in part on data read by the sensing module and to generate a powering schedule for the plurality of objects based at least in part on the device characteristics, the device characteristics including at least one of power usage data for the plurality of objects or an indication of an amount of data to be communicated to the reader device from the plurality of objects,
   and wherein the sensing module is further arranged to implement the powering schedule generated by the scheduler module.

2. The reader device according to claim 1, wherein the sensing module is arranged to implement the powering schedule by selectively activating and deactivating one or more of the RF antennas according to the powering schedule.

3. The reader device according to claim 1, wherein the sensing module is arranged to implement the powering schedule by communicating at least a part of the powering schedule to the short-range wireless tag in one of the plurality of objects.

4. The reader device according to claim 3, wherein the sensing module is arranged to communicate a sequence of commands to the short-range wireless tag in one of the plurality of objects, each command specifying a change in operating state of the object.

5. The reader device according to claim 3, wherein the sensing module is arranged to communicate scheduling data to the short-range wireless tag in one of the plurality of objects and wherein the scheduling data, when implemented in the object, causes the object to switch between operating states at predefined times.

6. The reader device according to claim 1, wherein the data read from the plurality of objects comprises an identifier for each object and wherein the scheduler module is arranged to obtain the device characteristics for an object by performing a database look-up using the identifier for the object.

7. The reader device according to claim 1, wherein the device characteristics for an object comprise a measured or a pre-defined power consumption of the object in one or more different operating states.

8. The reader device according to claim 1, wherein the device characteristics for an object comprise a metric indicating the efficiency of power transfer from the reader device to the short-range wireless tag in the object.

9. The reader device according to claim 8, wherein the data read from the object comprises the metric indicating the efficiency of power transfer and wherein the metric is based on measurements made within the object.

10. The reader device according to claim 8, wherein the metric indicating the efficiency of power transfer for the object is generated by the reader device based on measurements made when reading data from the object.

11. The reader device according to claim 1, wherein the one or more antennas comprises a plurality of RF antennas.

12. A reader device for short-range wireless tags comprising:
   one or more RF antennas, wherein the one or more RF antennas comprises:
      a first array of RF antennas in a first plane; and
      a second array of RF antennas in a second plane parallel to and spaced from the first plane; and
   a scheduler module arranged to obtain device characteristics for the plurality of objects based at least in part on data read by the sensing module and to generate a powering schedule for the plurality of objects based at least in part on the device characteristics,
   and wherein the sensing module is further arranged to implement the powering schedule generated by the scheduler module.

13. A reader device for short-range wireless tags comprising:
   one or more RF antennas, wherein the one or more RF antennas comprises:
      a first set of RF antennas optimized for communication with proximate short-range wireless tags; and
      a second set of RF antennas optimized for power transfer to proximate short-range wireless tags; and
   a scheduler module arranged to obtain device characteristics for the plurality of objects based at least in part on data read by the sensing module and to generate a powering schedule for the plurality of objects based at least in part on the device characteristics,
   and wherein the sensing module is further arranged to implement the powering schedule generated by the scheduler module.

14. The reader device according to claim 1, further comprising:
   a capacitive sensing electrode array; and
   a second sensing module coupled to the capacitive sensing electrode array and arranged to detect an increase in capacitance between electrodes in the array.

15. The reader device according to claim 14, wherein the second sensing module is arranged to generate a trigger signal in response to detecting an increase in capacitance between electrodes in the capacitive sensing electrode array at a position on the capacitive sensing electrode array and wherein the reader device, is arranged, in response to receiving the trigger signal, to select and activate an RF antenna based on the detected position of the increase in capacitance.

16. The reader device according to claim 1, wherein the device characteristics comprise variable data.

17. The reader device according to claim 1, wherein the device characteristics comprise static data.

18. The reader device according to claim 1, wherein the plurality of objects comprises at least one smart object.

19. The reader device according to claim 1, further comprising a plurality of RF antennas, wherein the scheduler module is further arranged to poll each object of the plurality of objects to determine a location of each object to spatially segment the plurality of RF antennas based on the location of each of the objects.

20. The reader device according to claim 1, further comprising a plurality of RF antennas, wherein the powering schedule defines an order and timing of activation of the plurality of RF antennas and identifies one or more objects of the plurality of objects permitted to harvest power from the plurality of RF antennas.

* * * * *